United States Patent
Lin et al.

(10) Patent No.: US 7,547,106 B2
(45) Date of Patent: Jun. 16, 2009

(54) SIMULATED HIGH REFRACTIVE INDEX GLASS

(75) Inventors: Chia-Cheng Lin, Allison Park, PA (US); Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 176 days.

(21) Appl. No.: 11/192,529

(22) Filed: Jul. 29, 2005

(65) Prior Publication Data

US 2007/0025000 A1    Feb. 1, 2007

(51) Int. Cl.
G02B 27/00 (2006.01)
B60J 1/02 (2006.01)
B32B 15/00 (2006.01)
B32B 17/06 (2006.01)

(52) U.S. Cl. .................. 359/614; 296/96.19; 428/432

(58) Field of Classification Search ............... 359/609, 359/614, 883; 428/432; 296/190.1, 84.1, 296/96.19

See application file for complete search history.

(56) References Cited

U.S. PATENT DOCUMENTS

| | | | | |
|---|---|---|---|---|
| 3,660,061 A | 5/1972 | Donley et al. | ............... | 65/32 |
| 4,111,150 A | 9/1978 | Donley et al. | ............... | 118/7 |
| 4,379,040 A | 4/1983 | Gillery | ............... | 204/192 P |
| 4,719,126 A | 1/1988 | Henery | ............... | 427/165 |
| 4,719,127 A | 1/1988 | Greenberg | ............... | 427/165 |
| 4,853,257 A | 8/1989 | Henery | ............... | 427/166 |
| 4,861,669 A | 8/1989 | Gillery | ............... | 428/434 |
| 4,900,110 A | 2/1990 | Sleighter | ............... | 350/1.7 |
| 4,900,633 A | 2/1990 | Gillery | ............... | 428/432 |
| 4,971,843 A | 11/1990 | Michelotti et al. | ............... | 428/34 |
| 5,464,657 A | 11/1995 | Athey et al. | ............... | 427/255.5 |
| 5,510,141 A | 4/1996 | Makita et al. | ............... | 427/165 |
| 5,599,387 A | 2/1997 | Neuman et al. | ............... | 106/287.14 |
| 5,618,585 A | 4/1997 | Hechler et al. | ............... | 427/376.1 |
| 5,948,131 A | 9/1999 | Neuman | ............... | 65/60.2 |
| 6,706,407 B2 * | 3/2004 | Sugiyama et al. | ............... | 428/432 |
| 2002/0122962 A1 | 9/2002 | Arfsten et al. | ............... | 428/697 |
| 2002/0155299 A1 | 10/2002 | Harris et al. | ............... | 428/428 |
| 2003/0224181 A1 | 12/2003 | Finley et al. | ............... | 428/432 |

FOREIGN PATENT DOCUMENTS

| | | | |
|---|---|---|---|
| EP | 1002773 | * | 5/2000 |
| WO | WO97/31871 | * | 9/1997 |

OTHER PUBLICATIONS

H. Dislich et al., Thin Film Solids, vol. 77, 1981, p. 129-139, "Amorphous and Crystaline Dip Coatings Obtained from Organometallic Solutions: Procedures, Chemical Processes and Products."

G. Schnottner, Chem. Mater., vol. 13, 2001, p. 3422-3455, "Hybrid Sol-Gel Derived Polymers: Applications of Multifunctional Materials."

* cited by examiner

Primary Examiner—Alessandro Amari
(74) Attorney, Agent, or Firm—Andrew C. Siminerio

(57) ABSTRACT

A method for modifying the appearance of a substrate is disclosed. The method includes providing a substrate having first and second opposing surfaces and depositing a reflectance modifying coating on at least a portion of the first surface of the substrate, wherein the second surface has a visible light reflectance (R1) ranging from 5 to 20 percent.

13 Claims, No Drawings

SIMULATED HIGH REFRACTIVE INDEX GLASS

FIELD OF THE INVENTION

The present invention relates to methods for modifying the appearance of a substrate, and in particular methods that include depositing a coating on glass substrates to increase the visible light reflectance of the coated substrate while maintaining the reflected and transmitted color.

BACKGROUND

Glass substrates are used in a variety of applications such as automotive applications, architectural applications, aerospace applications, etc. For example, glass substrates are used as vision panels (i.e. front windshields, sidelights, etc.) in automotive applications. Depending on the end use of the glass substrate, the desired aesthetic properties such as, but not limited to, visible light reflectance, visible light transmittance, reflected color, etc., for the glass substrate will be different. In certain instances, it may be desirable to use a glass substrate that has a "brilliant appearance" as a vision panel in an automotive application. The term "brilliant appearance" means the glass substrate exhibits a visible light reflectance ranging from 5 to 20 percent, for example, from 9 to 15 percent, or from 10 to 12 percent. The use of such a vision panel could provide a competitive advantage to car manufactures.

The present invention provides a method for modifying the appearance of a glass substrate to give it a brilliant appearance. The method includes depositing a reflectance modifying coating on a particular side of a substrate.

SUMMARY OF THE INVENTION

In a non-limiting embodiment, the present invention is a method for modifying the appearance of a substrate comprising providing a substrate having first and second opposing surfaces and depositing a reflectance modifying coating on at least a portion of the first surface of the substrate, wherein the second surface has a visible light reflectance (R1) ranging from 5 to 20 percent In another non-limiting embodiment, the present invention is a method for modifying the appearance of a substrate comprising providing a substrate having first and second opposing surfaces and depositing a reflectance modifying coating by a CVD process on at least a portion of the first surface of a substrate, wherein the second surface has a visible light reflectance (R1) ranging from 5 to 20 percent.

In yet another embodiment, the present invention is an article comprising a substrate having first and second opposing surfaces and a reflectance modifying coating on at least a portion of the first surface of the substrate, wherein the second surface has a visible light reflectance (R1) ranging from 5 to 20 percent.

DESCRIPTION OF THE INVENTION

The present invention is a method for modifying the appearance of a substrate to provide a substrate having a brilliant appearance as defined above. The method of the present invention comprises depositing a reflectance modifying coating on at least a portion of a substrate. The reflectance modifying coating is deposited on the side of the substrate that is not the target of the modification. The side of the substrate opposite the reflectance modifying coating is the side (referred to herein as the "brilliant side") with which the present invention is directed.

The reflectance modifying coating is non-absorbing of visible light and exhibits low dispersion. As used herein, "exhibits low dispersion" means the measured refractive index (n) of the coating at different wavelengths changes very little from 370 nanometers (nm) to 700 nm. The difference in refractive index measured at 370 nm and at 700 nm is referred to as $\Delta n$. In a non-limiting embodiment of the present invention, the reflectance modifying coating has a $\Delta n$ of less than or equal to 0.35, for example, less than or equal to 0.30, or less than or equal 0.25. Table 1 lists $\Delta n$ for various compounds.

TABLE 1

$\Delta n$ for various materials

|  | n at 370 nm | n at 700 nm | $\Delta n$ |
|---|---|---|---|
| $Ta_2O_5$ | 2.21 | 2.12 | 0.09 |
| $Al_2O_3$ | 1.66 | 1.61 | 0.05 |
| $TiO_2$ | 2.52 | 2.22 | 0.30 |
| $SnO_2$ | 2.07 | 1.96 | 0.11 |

In a non-limiting embodiment of the invention, the reflectance modifying coating has a refractive index ranging from 1.7 to 2.2 at 550 nm. Suitable materials for the reflectance modifying coating in this embodiment of the invention include, but are not limited to, alumina ($Al_2O_3$), tin oxide ($SnO_2$), tantalum oxide ($Ta_2O_5$), titania ($TiO_2$), zirconia ($ZrO_2$), zinc oxide (ZnO), zinc stannate ($Zn_xSn_{1-x}O_{2-x}$ where x is greater than 0 but less than 1), or mixtures thereof.

According to the present invention, the step of depositing the reflectance modifying coating can be accomplished using conventional deposition techniques such as sol gel techniques, chemical vapor deposition ("CVD"), spray pyrolysis, vacuum deposition techniques and magnetron sputtered vacuum deposition ("MSVD") as are well known in the art.

Suitable CVD methods of deposition are described in the following references, which are hereby incorporated by reference: U.S. Pat. Nos. 4,853,257; 4,971,843; 5,464,657; 5,599,387; and 5,948,131.

Suitable spray pyrolysis methods of deposition are described in the following references, which are hereby incorporated by reference: U.S. Pat. Nos. 4,719,126; 4,719,127; 4,111,150; and 3,660,061.

Suitable MSVD methods of deposition are described in the following references, which are hereby incorporated by reference: U.S. Pat. Nos. 4,379,040; 4,861,669; and 4,900,633.

Other well known deposition techniques such as plasma enhanced CVD ("PECVD") and plasma assisted CVD ("PACVD") can also be utilized in the present invention.

According to the present invention, the reflectance modifying coating can be deposited at any thickness. In one non-limiting embodiment, the physical thickness of the deposited reflectance modifying coating can range from equal to or less than 200 Å, for example, from 50 Å to 175 Å. The exact thickness of the deposited reflectance modifying coating depends on the performance properties desired in the final product.

According to the present invention, other steps can be performed in addition to depositing the reflectance modifying coating. In a non-limiting embodiment, the invention further comprises heating the substrate after the reflectance modifying coating has been deposited. Such heating step might be necessary if the coating is applied via a sol gel technique.

According to the present invention, the substrate is not limited to any particular category of materials. In a non-limiting embodiment of the invention, the substrate is a transparent material (i.e., exhibits a visible light transmittance of at least 10% at a thickness of 0.189 inches (4.8 mm) such as glass, plastic, etc. In another non-limiting embodiment of the invention, the substrate is made of glass commercially available from PPG Industries, Inc. (Pittsburgh, Pa.) under the names SOLEXTRA® glass, STARPHIRE® glass and Vista-Gray™ glass.

In yet another non-limiting embodiment of the invention, the substrate is a float glass ribbon as is well known in the art, and the glass is coated while it is on the molten tin. More specifically, the glass ribbon will be at a temperature ranging from 600° C. (1,100° F.) to 800° C. (1,472° F.) during the step of depositing a reflectance modifying coating. Because the glass ribbon is not dimensionally stable at temperatures above 800° C., it would not be practical to deposit a coating at a temperature that high.

After the steps of the present invention have been performed, a coated article will be realized that exhibits a visible light reflectance viewed from the uncoated side (R1) ranging from 5 to 20 percent, for example, from 9 to 15 percent, or from 10 to 12 percent on its brilliant side.

In a non-limiting embodiment of the invention, after the method of the invention has been performed, a coated article having at least one side that has essentially the same color after the steps of the invention have been performed (i.e., E at time=1) as before the steps were performed (i.e., E at time=0). The variance in the color of a surface of an article before the steps of the invention have been performed and after the invention has been performed is quantified using $\Delta E$ (i.e., (E at time=1)–(E at time=0)). E is representative of the color of a surface as expressed in terms of color space coordinates $a^*$, $b^*$ and $L^*$. The lower the $\Delta E$, the closer the color match.

According to the present invention, $\Delta E$ is the total color difference computed with a color difference equation which in this case is "CMC (1:c) color difference". CMC (1:c) color difference is the color difference calculated by use of a formula developed by the Colour Measurement Committee of the Society of Dyers and Colourists of Great Britian. Since most of the substrates according to the invention can exhibit both reflected color and transmitted color, $\Delta E$ reflectance and $\Delta E$ transmittance can be measured and recorded for the substrates. Calculations for $\Delta E$ reflectance utilize reflected color space coordinates in the color difference equation. Calculations for $\Delta E$ transmittance utilize transmitted color space coordinates in the color difference equation.

In a non-limiting embodiment of the invention, an article undergoing the steps of the invention will have at least one surface (i.e., R1) that exhibits a $\Delta E$ reflectance of less than or equal to 40, for example, less than or equal to 30, or less than or equal to 25. In another non-limiting embodiment of the invention, an article undergoing the steps of the invention will have at least one surface (i.e., R1) that exhibits a $\Delta E$ transmittance of less than or equal to 15, for example, less than or equal to 10, or less than or equal to 8. In yet another non-limiting embodiment of the invention, an article undergoing the steps of the invention will have at least one surface that exhibits a visible light transmittance (Lta) of greater than 70 percent. In such an embodiment, the coated article can be made into a laminate, e.g. an automotive windshield.

The present invention also encompasses a coated article that includes a reflectance modifying coating.

EXAMPLES

The present invention is illustrated by the following non-limiting examples. Examples 1-9 were prepared in the following manner: for each example, the ingredients listed in Table 2 below were added to a jar in the order listed. After each ingredient was added to the jar, the jar was shaken to mix the contents.

TABLE 2

Ingredients used to make the Exemplary Compositions

| | Exs. 1–4 | Ex. 5 | Ex. 6 | Ex. 7 | Ex. 8 | Ex. 9 |
|---|---|---|---|---|---|---|
| Substrate | SOLEXTRA® glass[1] | SOLEXTRA® glass | VistaGray™ glass[2] | VistaGray™ glass | STARPHIRE® glass[3] | STARPHIRE® glass |
| First Ingredient | 95.06 g of 2-propanol | 6280.0 g of 1-propanol | 91.0 g of 1-propanol | 95.0 g of 1-propanol | 92.58 g of 2-propanol | 91.0 g of 1-propanol |
| Second Ingredient | 5.09 g of titanium IV butoxide | 322.4 g of 1.5 pentanediol | 7.14 g of zirconium n-propoxide | 0.25 g of conc. $HNO_3$ | 0.25 g of conc. $HNO_3$ | 3.54 g of zirconium n-propoxide |
| Third Ingredient | 0.25 g of conc. $HNO_3$ | 2.58 g of conc. $HNO_3$ | 0.25 g of conc. $HNO_3$ | 5.0 g of zirconium n-propoxide | 2.58 g of titanium iso-butoxide | 0.25 g of conc. $HNO_3$ |
| Fourth Ingredient | 5.0 g of 1.5 pentanediol | 220.7 g of zirconium n-propoxide | 5.0 g of 1.5 pentanediol | 5.0 g of 1.5 pentanediol | 5.0 g of 1.5 pentanediol | 5.0 g of 1.5 pentanediol |
| Fifth Ingredient | 0.50 g of BYK®-306[4] | 2.54 g of BYK®-306 | 0.50 g of BYK®-306 | 0.50 g of BYK®-306 | 0.50 g of BYK®-306 | 0.50 g of BYK®-306 |
| Sixth Ingredient | 2.57 g of tetramethyl-ammonium acetate solution 20% | 32.3 g of tetramethyl-ammonium acetate powder | 0.5 g of tetramethyl-ammonium acetate powder | 0.48 g of tetramethyl-ammonium acetate powder | | 0.5 g of tetramethyl-ammonium acetate powder |
| Seventh Ingredient | | 100.3 g of 1-propanol | | | | |
| Eighth Ingredient | | 100.3 g of zirconium n-propoxide | | | | |
| Ninth Ingredient | | 100.8 g of 1-propanol | | | | |

TABLE 2-continued

| | Ingredients used to make the Exemplary Compositions | | | | | |
|---|---|---|---|---|---|---|
| | Exs. 1–4 | Ex. 5 | Ex. 6 | Ex. 7 | Ex. 8 | Ex. 9 |
| Tenth Ingredient | | 100.8 g of zirconium n-propoxide | | | | |

[1]SOLEXTRA ® glass is a high performance green glass which is commercially available from PPG Industries, Inc. (Pittsburgh, PA).
[2]VistaGray ™ glass is a gray glass which is commercially available from PPG Industries, Inc. (Pittsburgh, PA).
[3]STARPHIRE ® glass is an ultra clear glass which is commercially available from PPG Industries, Inc. (Pittsburgh, PA).
[4]BYK ®-306 is a highly effective silicone surface additive to provide good substrate wetting of critical substrates and good anti-crater performance by reduction of surface tension of the coatings. It is commercially available from BYK-Chemie GmbH (Germany).

The exemplary compositions were deposited on a 4 inch (10.16 cm)×4 inch (10.16 cm)×about 0.1522 inch (0.3866 cm) glass substrate using a spin coating method for Examples 1-4. The substrate thickness was about 0.139 inch (0.3531 cm) for Examples 6 and 7. The substrate thickness was about 0.4854 inch (1.2329 cm) for Examples 8 and 9. The thickness of the deposited coating is less than 100 angstroms. The substrate for each example is identified in Table 2. The spin coating method involved applying 5 ml of the exemplary composition at a spin speed of 600 rpm for a period of 30 seconds. The substrates were coated at room temperature (73.2° F.) in an environment at 17% relative humidity. For Example 5, the coating solution was applied to a 0.1516 inch (0.3851 cm) thick glass substrate by a draw-coating technique at a drawing speed of about 8 inches per minute. The coated glass samples were next heated for about 7 minutes at 600° C. in an electric muffle furnace.

Substrates coated with titania (Examples 1-4, and 8) were formed using precursor compositions that contained titanium IV butoxide or titanium iso-butoxide, and substrates coated with zirconia (Examples 5-7, and 9) were formed using compositions that contained zirconium n-propoxide. For Examples 2 and 4, the coating solution was further diluted from 5% $TiO_2$ to 2.5% $TiO_2$ prior to spin coating the substrate.

Exemplary substrates and controls (uncoated substrates) were analyzed for various transmittance and reflectance properties using a Perkin-Elmer Lambda 9 spectrophotometer. See the results of the analysis in Table 3. The performance properties were measured at normal incidence. Visible light transmittance (Lta) and visible light reflectance on the brilliant side (R1) were measured using C.I.E. 1931 standard illuminant "A" over the wavelength range 380 to 770 nanometers at 10 nanometer intervals. Color (L*, a*, b*) was measured using illuminant "D65" with a 10° observer.

TABLE 3

Performance Properties of Substrates according to the Present Invention

| | Uncoated SOLEXTRA ® Glass | Ex. 1 | Ex. 2 | Ex. 3 | Ex. 4 | Ex. 5 |
|---|---|---|---|---|---|---|
| Transmittance Properties | | | | | | |
| Lta | 72.86 | 60.88 | 68.97 | 59.74 | 68.63 | 68.83 |
| L* | 89.88 | 83.27 | 87.74 | 82.62 | 87.55 | 87.71 |
| a* | −8.35 | −7.63 | −8.26 | −7.49 | −8.24 | −7.96 |
| b* | −5.08 | −0.04 | −2.53 | 0.14 | −2.37 | −3.30 |
| $\Delta E_{CMC}(1:1)$ | | 7.08 | 3.06 | 7.53 | 3.27 | 2.32 |
| Reflectance Properties | | | | | | |
| R1 | 6.93 | 16.49 | 10.11 | 17.47 | 10.47 | 10.46 |
| L* | 32.24 | 49.86 | 39.54 | 51.13 | 40.24 | 40.02 |
| a* | −2.94 | −7.11 | −3.97 | −7.58 | −4.10 | −4.70 |
| b* | −2.53 | −13.55 | −10.31 | −13.44 | −10.73 | −8.19 |
| $\Delta E_{CMC}(1:1)$ | | 24.94 | 12.59 | 26.26 | 13.53 | 11.21 |

| | Uncoated VistaGray ™ glass | Ex. 6 | Ex. 7 | Uncoated STARPHIRE ® glass | Ex. 8 | Ex. 9 |
|---|---|---|---|---|---|---|
| Transmittance Properties | | | | | | |
| Lta | 73.31 | 68.12 | 70.79 | 90.72 | 86.17 | 88.84 |
| L* | 88.84 | 86.14 | 87.54 | 96.36 | 94.24 | 95.51 |
| a* | −2.97 | −2.75 | −2.93 | −0.59 | −0.52 | −0.54 |
| b* | 1.44 | 3.14 | 2.47 | 0.08 | 2.55 | 1.05 |
| $\Delta E_{CMC}(1:1)$ | | 2.62 | 1.58 | | 3.93 | 1.35 |

TABLE 3-continued

Performance Properties of Substrates according to the Present Invention

| Reflectance Properties | | | | | | |
|---|---|---|---|---|---|---|
| R1 | 6.95 | 10.93 | 8.92 | 7.90 | 12.31 | 9.78 |
| L* | 32.32 | 40.14 | 36.35 | 33.84 | 42.51 | 37.84 |
| a* | −2.98 | −2.52 | −1.79 | −0.16 | −0.49 | −0.45 |
| b* | −2.77 | −4.22 | −3.39 | −0.45 | −8.00 | −3.76 |
| $\Delta E_{CMC}(1:1)$ | | 12.19 | 7.61 | | 15.09 | 6.78 |

CONCLUSION

The performance results show that in non-limiting Examples 1-9, glass substrates coated according to the present invention (i.e., the reflectance modifying coating has a Δn as specified) having a visible light reflectance (R1) on their brilliant sides ranging from 10 to 18 percent can be realized according to the present invention. Also, the reflectance modification can be achieved without changing the reflected color of the substrate as exhibited by the ΔE reflectance values ranging from 7 to 25. The reflectance modification can be achieved without changing the transmitted color of the substrate as exhibited by the ΔE transmittance values ranging from 1 to 8. Further, the method of the present invention can be performed on various substrates as illustrated by Examples 1-4 and 5 (SOLEXTRA® glass); Examples 6 and 7 (VistaGray™ glass); and Examples 8 and 9 (STARPHIRE® glass).

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A method for modifying the appearance of a substrate comprising:
   providing a substrate having first and second opposing surfaces; and
   depositing a reflectance modifying coating on at least a portion of the first surface of the substrate, wherein the second surface has a visible light reflectance (R1) ranging from 5 to 20 percent, wherein the reflectance modifying coating provides the coated article with a ΔE reflectance of less than or equal to 25 and a ΔE transmittance of less than or equal to 8.

2. The method according to claim 1, wherein the visible light reflectance from the second surface ranges from 9 to 15 percent.

3. The method according to claim 1, wherein the reflectance modifying coating has a Δn of less than or equal to 0.35 at a wavelength ranging from 370 nm to 700 nm.

4. The method according to claim 1, wherein the reflectance modifying coating has a refractive index ranging from 1.7 to 2.2 at 550 nm.

5. The method according to claim 1, wherein the reflectance modifying coating is selected from $Al_2O_3$, $SnO_2$, $Ta_2O_5$, $TiO_2$, $ZrO_2$, ZnO and $Zn_xSn_{1-x}O_{2-x}$ where x is greater than 0 but less than 1, and mixtures thereof.

6. The method according to claim 1, wherein the step of depositing is accomplished via a CVD process.

7. The method according to claim 1, wherein the reflectance modifying coating has a thickness equal to or less than 200 Å.

8. The method according to claim 7, wherein the reflectance modifying coating has a thickness ranging from 50 Å to 175 Å.

9. The method according to claim 1, wherein the substrate is glass.

10. The method according to claim 9, wherein the substrate is a glass float ribbon.

11. A method for modifying the appearance of a substrate comprising:
    providing a substrate having first and second opposing surfaces; and
    depositing a reflectance modifying coating by a CVD process on at least a portion of the first surface of a substrate, wherein the second surface has a visible light reflectance (R1) ranging from 5 to 20 percent, wherein the reflectance modifying coating provides the coated article with a ΔE reflectance of less than or equal to 25 and a ΔE transmittance of less than or equal to 8.

12. The method according to claim 11, wherein the reflectance modifying coating is selected from $Al_2O_3$, $SnO_2$, $Ta_2O_5$, $TiO_2$, $ZrO_2$, ZnO and $Zn_xSn_{1-x}O_{2-x}$ where x is greater than 0 but less than 1 and mixtures thereof.

13. A method for providing a brilliant appearance to an automotive vision panel, the method comprising:
    providing an automotive vision panel having a first surface and a second surface; and
    depositing a reflectance modifying coating on at least a portion of the first surface of the vision panel, wherein the reflectance modifying coating comprises at least one material having a refractive index in the range of 1.7 to 2.2 at a wavelength of 550 nm, wherein the reflectance modifying coating has a thickness of less than or equal to 200 Å, wherein the reflectance modifying coating provides a Δn of less than or equal to 0.30 over a range of 370 nm to 700 nm, wherein the reflectance modifying coating provides a ΔE reflectance of less than or equal to 25 and a ΔE transmittance of less than or equal to 8, and wherein the reflectance modifying coating provides the second surface with a visible light reflectance in the range of 5 to 20 percent.

* * * * *